(12) United States Patent
Tyler et al.

(10) Patent No.: US 11,220,048 B2
(45) Date of Patent: *Jan. 11, 2022

(54) ADDITIVE MANUFACTURING METHOD FOR DISCHARGING INTERLOCKING CONTINUOUS REINFORCEMENT

(71) Applicant: Continuous Composites Inc., Coeur d'Alene, ID (US)

(72) Inventors: Kenneth Lyle Tyler, Coeur d'Alene, ID (US); Ryan C. Stockett, Spokane, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 567 days.

This patent is subject to a terminal disclaimer.

(21) Appl. No.: 16/136,539

(22) Filed: Sep. 20, 2018

(65) Prior Publication Data

US 2019/0184634 A1 Jun. 20, 2019

Related U.S. Application Data

(62) Division of application No. 15/846,305, filed on Dec. 19, 2017, now Pat. No. 10,131,088.

(51) Int. Cl.
*B29C 64/209* (2017.01)
*B29C 64/141* (2017.01)
*B33Y 30/00* (2015.01)
*B33Y 10/00* (2015.01)

(52) U.S. Cl.
CPC .......... *B29C 64/209* (2017.08); *B29C 64/141* (2017.08); *B33Y 10/00* (2014.12); *B33Y 30/00* (2014.12)

(58) Field of Classification Search
CPC ..... B29C 64/209; B29C 64/141; B29C 64/10; B29C 64/106; B29C 64/118; B29C 64/124; B29C 64/129; B29C 64/135; B29C 64/165; B29C 64/171; B29C 64/176; B29C 64/182; B29C 64/194; B29C 64/20; B29C 64/205; B29C 64/264; B29C 64/277; B29C 64/282; B29C 64/291; B29C 64/393
See application file for complete search history.

(56) References Cited

U.S. PATENT DOCUMENTS

2018/0065316 A1* 3/2018 Tyler ................... B29C 48/2556

* cited by examiner

*Primary Examiner* — Stella K Yi
(74) *Attorney, Agent, or Firm* — Ryan C. Stockett

(57) ABSTRACT

An additive manufacturing method is disclosed. The method may include directing into a print head a reinforcement having a continuous axial core and integral branches extending radially outward from the continuous axial core. The method may also include coating the reinforcement in a matrix, and softening a portion of a track of the coated reinforcement that was previously discharged from the print head. The method may further include discharging from the print head a track of the coated reinforcement adjacent the previously discharged track of the coated reinforcement, such that cross-bonding of the integral branches occurs between the discharging track of the coated reinforcement and the softened portion of the previously discharged track of the coated reinforcement.

20 Claims, 5 Drawing Sheets

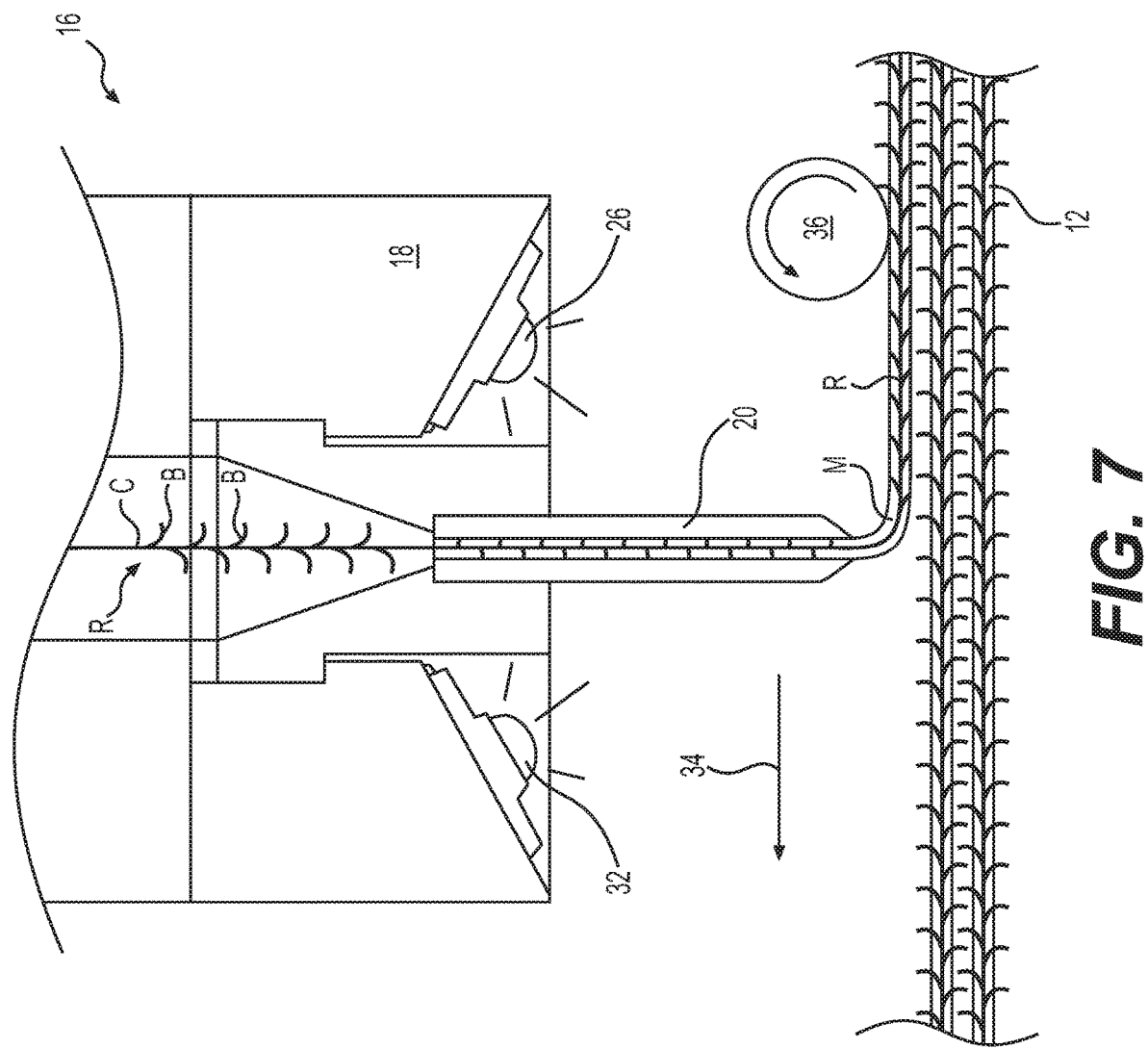

ADDITIVE MANUFACTURING METHOD FOR DISCHARGING INTERLOCKING CONTINUOUS REINFORCEMENT

RELATED APPLICATIONS

This application is a divisional of, and claims the benefit of priority to, application Ser. No. 15/846,305 that was filed on Dec. 19, 2017, the contents of which are expressly incorporated herein by reference.

TECHNICAL FIELD

The present disclosure relates generally to a manufacturing method and, more particularly, to an additive manufacturing method for discharging interlocking continuous reinforcement.

BACKGROUND

Continuous fiber 3D printing (a.k.a., CF3D™) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although continuous fiber 3D printing provides for increased strength, compared to manufacturing processes that do not utilize continuous fiber reinforcement, inter-layer strength can be too low for some applications. Specifically, when new material is discharged over the top of a layer of existing and already-cured material, the bond between the layers of material may be low due to a lack of fibers extending between the layers. And in some applications, this reduced inter-layer strength may be problematic.

The disclosed system and method are directed to addressing one or more of the problems set forth above and/or other problems of the prior art.

SUMMARY

In one aspect, the present disclosure is directed to a method of additively manufacturing a composite structure. The method may include directing into a print head a reinforcement having a continuous axial core and integral branches extending radially outward from the continuous axial core. The method may also include coating the reinforcement in a matrix, and softening a portion of a track of the coated reinforcement that was previously discharged from the print head. The method may further include discharging from the print head a track of the coated reinforcement adjacent the previously discharged track of the coated reinforcement, such that cross-bonding of the integral branches occurs between the discharging track of the coated reinforcement and the softened portion of the previously discharged track of the coated reinforcement.

In another aspect, the present disclosure is directed to another method of additively manufacturing a composite structure. This method may include directing a continuous reinforcement into a print head, and wetting the continuous reinforcement with a reversible matrix. The method may further include exposing a portion of a track of the wetted continuous reinforcement that was previously discharged from the print head and cured to a deactivation energy. The method may also include discharging from the print head a track of the wetted continuous reinforcement adjacent the exposed portion of the previously discharged track, and exposing at least the discharging track of the wetted continuous reinforcement to a cure energy to cause curing of the reversible resin.

In yet another aspect, the present disclosure is directed to a system for additively manufacturing a composite structure. The system may include a support moveable in multiple dimensions, and a print head connected to an end of the support. The print head may have a nozzle, and the system may further include a cure enhancer located at a trailing edge of the nozzle, and a deactivator located at a leading edge of the nozzle.

BRIEF DESCRIPTION OF THE DRAWINGS

FIGS. 3, 7, and 8 are enlarged diagrammatic illustrations of exemplary disclosed portions of the manufacturing systems of FIGS. 1 and 2.

DETAILED DESCRIPTION

Figure 1:
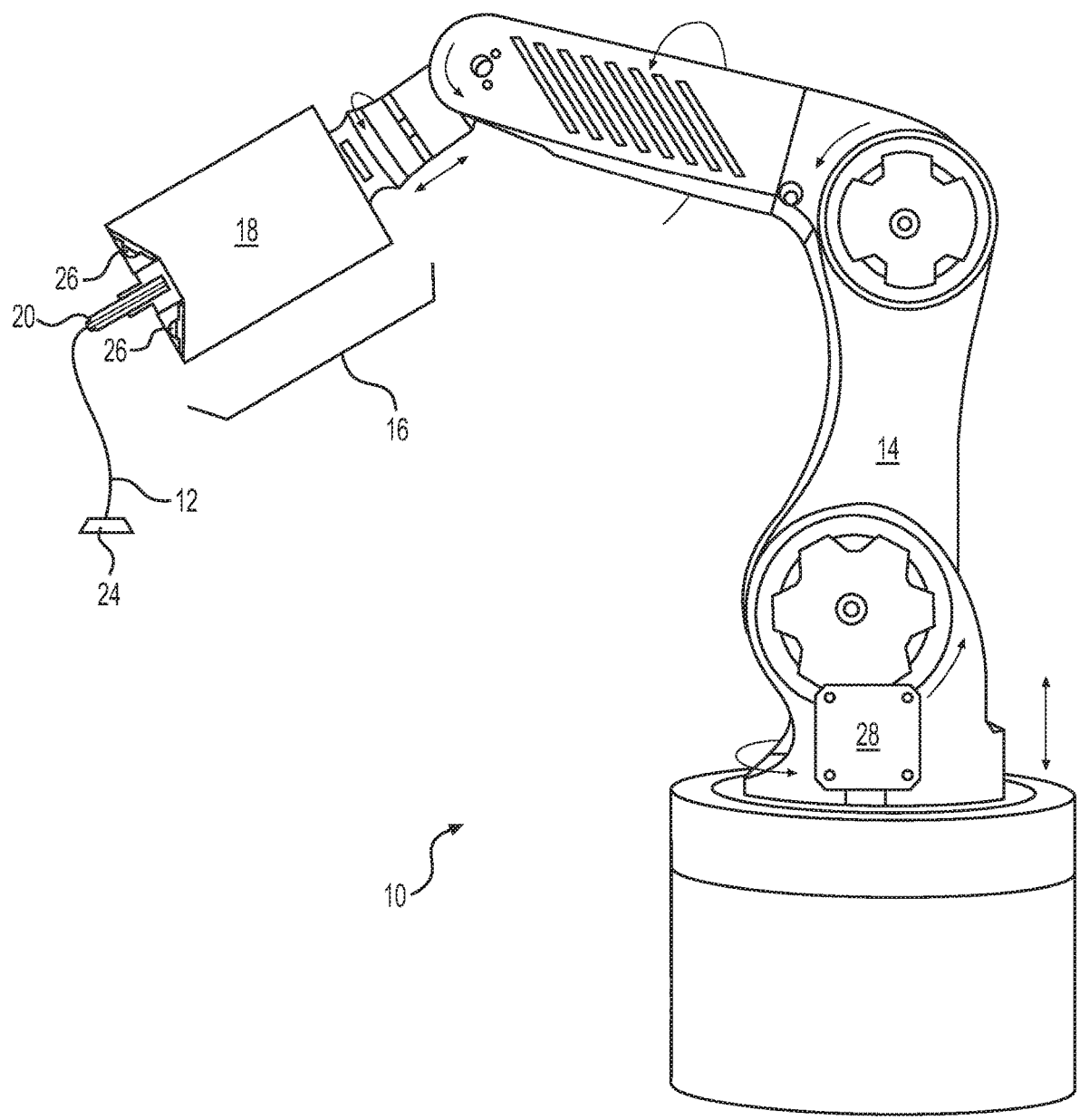
FIGS. 1 and 2 are diagrammatic illustrations of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may have a body 18 that is coupled to and moved by support 14, and a nozzle 20 located at an opposing discharge end of body 18. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Body 18 may be configured to receive or otherwise contain a matrix. The matrix may include any type of material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside body 18 may be pressurized, for example by an external device (e.g., an extruder or another type of pump—not shown) that is fluidly connected to head 16 via a corresponding conduit (not shown). In another embodiment, however, the pressure may be generated completely inside of body 18 by a similar type of device. In yet other embodiments, the matrix may be gravity-fed through and/or mixed within body 18. In some instances, the matrix inside body 18 may need to be kept cool and/or dark to inhibit premature curing; while in other instances, the matrix may need to be kept warm for the same reason. In either situation, body 18 may be specially configured (e.g., insulated, chilled, and/or warmed) to provide for these needs.

The matrix may be used to coat, encase, or otherwise surround any number of continuous reinforcements (e.g., separate fibers, tows, rovings, and/or sheets of material) and, together with the reinforcements, make up at least a portion (e.g., a wall) of composite structure 12. The reinforcements may be stored within (e.g., on separate internal spools—not shown) or otherwise passed through body 18 (e.g., fed from external spools 22—See FIG. 2). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from nozzle 20.

The reinforcements may be exposed to (e.g., at least partially coated with) the matrix while the reinforcements are passing through body 18. The matrix, dry reinforcements, and/or reinforcements that are already exposed to the matrix (a.k.a., wetted reinforcements) may be transported into body 18 in any manner apparent to one skilled in the art.

The matrix and reinforcement may be discharged from nozzle 20 as a track of composite material via at least two different modes of operation. In a first mode of operation, the matrix and reinforcement are extruded (e.g., pushed under pressure and/or mechanical force) from nozzle 20, as head 16 is moved by support 14 to create the 3-dimensional shape of structure 12. In a second mode of operation, at least the reinforcement is pulled from nozzle 20, such that a tensile stress is created in the reinforcement during discharge. In this mode of operation, the matrix may cling to the reinforcement and thereby also be pulled from nozzle 20 along with the reinforcement, and/or the matrix may be discharged from nozzle 20 under pressure along with the pulled reinforcement. In the second mode of operation, where the composite material is being pulled from nozzle 20, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from nozzle 20 as a result of head 16 moving away from an anchor point 24. In particular, at the start of structure-formation, a length of matrix-impregnated reinforcement may be pulled and/or pushed from nozzle 20, deposited onto anchor point 24, and cured, such that the discharged material adheres to anchor point 24. Thereafter, head 16 may be moved away from anchor point 24, and the relative movement may cause the reinforcement to be pulled from nozzle 20. It should be noted that the movement of reinforcement through body 18 could be assisted (e.g., via one or more internal and/or external feed mechanisms—not shown), if desired. However, the discharge rate of reinforcement from nozzle 20 may primarily be the result of relative movement between head 16 and anchor point 24, such that tension is created and maintained within the reinforcement. It is contemplated that anchor point 24 could be moved away from head 16 instead of or in addition to head 16 being moved away from anchor point 24.

One or more cure enhancers (e.g., a UV light, an ultrasonic emitter, a laser, a heater, a catalyst dispenser, etc.) 26 may be mounted proximate (e.g., within, on, and/or trailing from) head 16 (e.g., at a base of body 18, inside of body 18, outside of body 18, or otherwise adjacent nozzle 20) and configured to enhance a cure rate and/or quality of the matrix as it is discharged from head 16. Cure enhancer 26 may be controlled to selectively expose internal and/or external surfaces of structure 12 to energy (e.g., UV light, electromagnetic radiation, vibrations, heat, a chemical catalyst, hardener, or initiator, etc.) during the formation of structure 12. The energy may increase a rate of chemical reaction occurring within the matrix, sinter the material, harden the material, or otherwise cause the material to cure as it discharges from head 16.

A controller 28 may be provided and communicatively coupled with support 14, head 16, and any number and type of cure enhancers 26. Controller 28 may embody a single processor or multiple processors that include a means for controlling an operation of system(s) 10 and/or 12. Controller 28 may include one or more general- or special-purpose processors or microprocessors. Controller 28 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 28, including power supply circuitry, signal-conditioning circuitry, solenoid/motor driver circuitry, communication circuitry, and other appropriate circuitry. Moreover, controller 28 may be capable of communicating with other components of system 10 via wired and/or wireless transmission.

One or more maps may be stored in the memory of controller 28 and used during fabrication of structure 12. Each of these maps may include a collection of data in the form of lookup tables, graphs, and/or equations. In the disclosed embodiment, the maps are used by controller 28 to determine desired characteristics of cure enhancers 26, the associated matrix, and/or the associated reinforcements at different locations within structure 12. The characteristics may include, among others, a type, quantity, and/or configuration of reinforcement and/or matrix to be discharged at a particular location within structure 12, and/or an amount, shape, and/or location of desired curing. Controller 28 may then correlate operation of support 14 (e.g., the location and/or orientation of head 16) and/or the discharge of material from nozzle 20 (a type of material, desired performance of the material, cross-linking requirements of the material, a discharge rate, etc.) with the operation of cure enhancers 26 such that structure 12 is produced in a desired manner.

Figure 2:
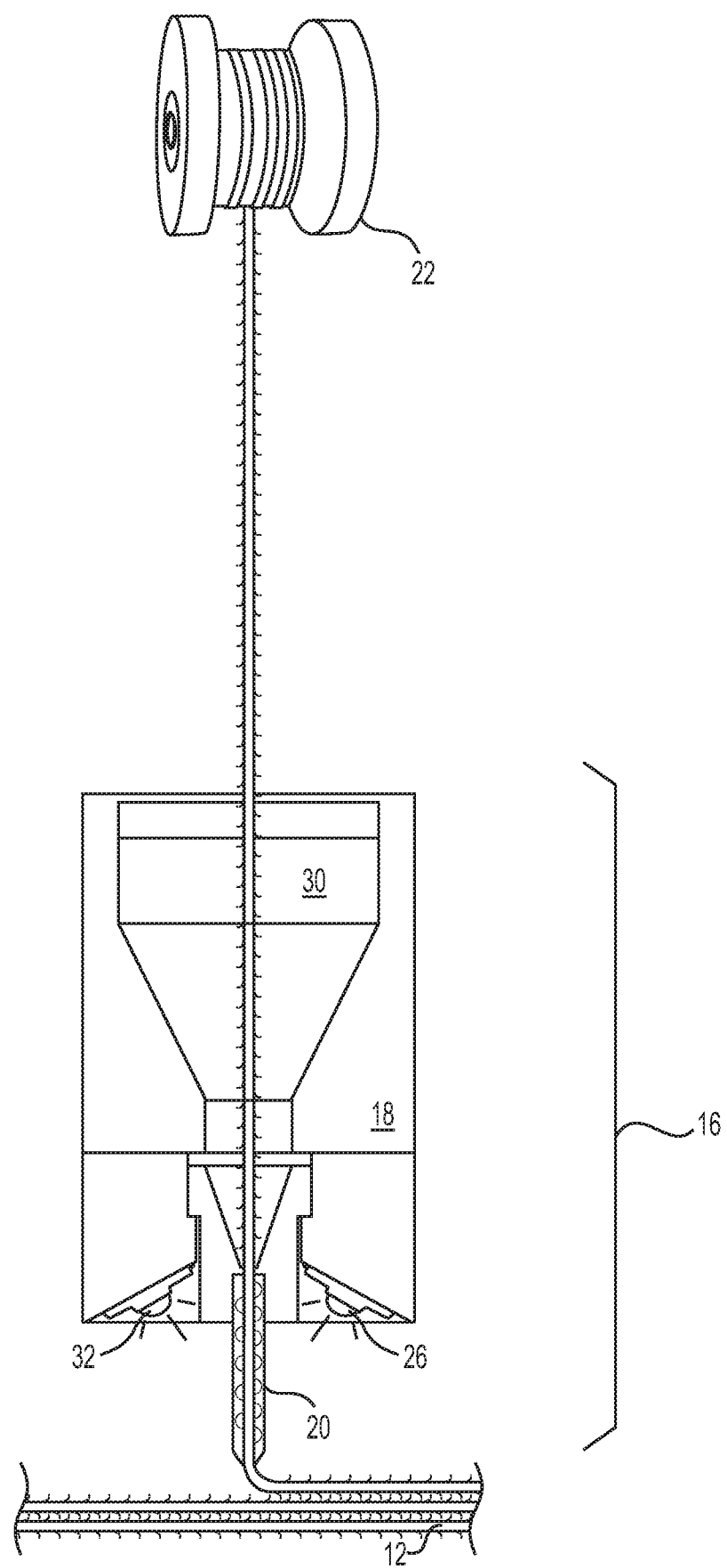
Figure 4:
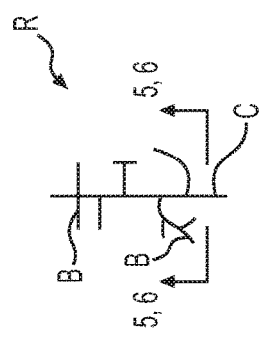
FIGS. 4, 5, and 6 are cross-sectional illustrations of an exemplary filament that may be used in conjunction with the manufacturing system of FIGS. 1 and 2.
Figure 5:
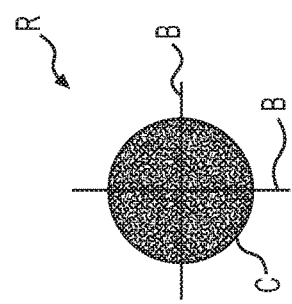
Figure 6:
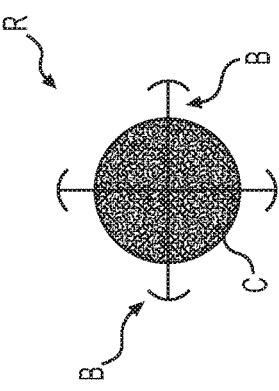

In some applications, care must be taken to ensure that each of the fibers passing through head 16 are sufficiently coated with matrix (i.e., coated sufficient to ensure proper bonding and curing) prior to discharge from nozzle 20. As shown in FIG. 2, the fibers may be exposed to the matrix during travel through one or more chambers 30 that are located inside of body 18. The matrix may be supplied to chamber 30 in several different ways. For example, the matrix may be provided as a gas-, a liquid-, or a powder-stream via a jet (not shown); as a bath via a supply inlet (not shown); as a suspension via a pressurized conduit (not shown); or in another manner known in the art. In some embodiments, a teasing device (e.g., brushes, rollers, jets, etc.) and/or a regulating device (e.g., opposing rollers, a squeegee, a wiper, a brush, an air jet, etc.—not shown) may be disposed upstream and/or downstream of chamber 30 to ensure adequate saturation and/or to remove excess matrix component from the reinforcements prior to the coated reinforcements entering nozzle 20. And upon the track of composite material exiting nozzle 20, curing may begin or speed up as a result of exposure of the matrix to energy from cure enhancers 26.

In some embodiments, in addition to the matrix described above, an additive may be mixed into the matrix. The additive may include, for example, a filler, a hardener, a catalyst, and/or an initiator. For instance, a UV cure initiator could be mixed into the matrix, if desired. The UV cure initiator may be sufficient to raise a temperature of the matrix coating the reinforcements to a minimum threshold temperature required for proper curing of the matrix.

As shown in FIGS. 3-6, the reinforcement (represented as R in FIGS. 3-6) being discharged through head 16 may have unique characteristics that allow for increased inter-layer strength within structure 12. For example, the reinforcement R may include any number of individual fibers that are oriented in a generally parallel relationship with each other. Each reinforcement R may have a continuous axial core C, and a plurality of branches B that stem radially outward from the core C. The branches B and core C may be integral and/or fixedly connected (e.g., via welding, chemical bonding, etc.), such that, as the core C is discharged (e.g., pulled) from nozzle 20, the branches B may be contemporaneously discharged from nozzle 20 due to their connections with the core C. Any number of branches B may stem from the same core C, with any axial and/or annular distribution. For example, each branch B may have a different axial stem location (see lower portion of FIG. 4) and/or a different annular stem location (See FIGS. 5 and 6). Alternatively, multiple branches B may have the same axial stem location (see upper portion of FIG. 4). The branches B may also have a repeated pattern of annular stem locations (e.g., with 90° separation—see FIGS. 5 and 6) or a random pattern (not shown), as desired. Each branch B may have a single extension (see FIG. 5) or multiple extensions (see lower-left of FIG. 4), that extend orthogonally from the core C or at an inclined or declined angle. Further, the branches B may include only radially extensions (see FIG. 5) or both radial and vertical extensions (see FIG. 6). Finally, the branches B may be completely linear or curvilinear.

Each branch B may have a natural or low-potential energy state, and a deformed or high-potential energy state. A branch B may extend a furthest radial distance from core C when in its natural state, and be compressed to a shorter radial distance when in its deformed state. In general, a branch B may be in its natural state outside of nozzle 20, and in its deformed state during passage through nozzle 20.

Once the reinforcement R has been coated with the matrix (represented by M in FIG. 3), a track of composite material may be discharged from nozzle 20 that includes both the matrix M and the embedded reinforcement R. The track of material may have an outer diameter d, corresponding to a diameter of the coating of matrix M on the core C of the reinforcement R. The diameter d may be larger than an outer diameter of the core C, and about equal to a discharge diameter at a tip (e.g., a smallest inner diameter) of nozzle 20. When the branches B are in their natural state, a diameter D of the reinforcement R (e.g., a radial distance between tip ends of opposing branches B) may be larger than the diameter d. However, during passage of the reinforcement R through nozzle 20, an outer diameter of the branches B may be reduced (e.g., compressed by inner walls of nozzle 20) to be about the same as the diameter d. With this configuration, after discharge of the reinforcement R from nozzle 20, the branches B may spring back to their natural state and extend radially out past the diameter d of the matrix coating on the core C.

The above-described extension of the branches B, radially outward past the diameter d of the matrix coating on the core C, may allow for mechanical interlocking between adjacent tracks and/or overlapping layers. For example, after a first layer of composite material is discharged by nozzle 20, the tips of branches B in the first layer may be exposed due to their radial-outward springing to their natural state. Thereafter, when a second layer of composite material is discharged adjacent (e.g., over the top of) the first layer of composite material, the exposed tips of the branches B may penetrate the matrix coating of the overlapping core C. The matrix of the second layer may cure after this penetration, such that the branches B of the first layer are internally bound within the matrix of the second layer.

In some embodiments, it may be beneficial for the branches B of the second layer discussed above to also be bound within the matrix of the first layer, such that cross-binding in multiple directions is achieved. This may be result in even greater interlayer strength. However, during typical fabrication of overlapping layers, the matrix of the first layer is generally cured and already hardened before the branches B of the second layer can penetrate the matrix of the first layer. For this reason, a unique matrix and/or reaction deactivator ("deactivator") 32 may be implemented.

Figure 3:
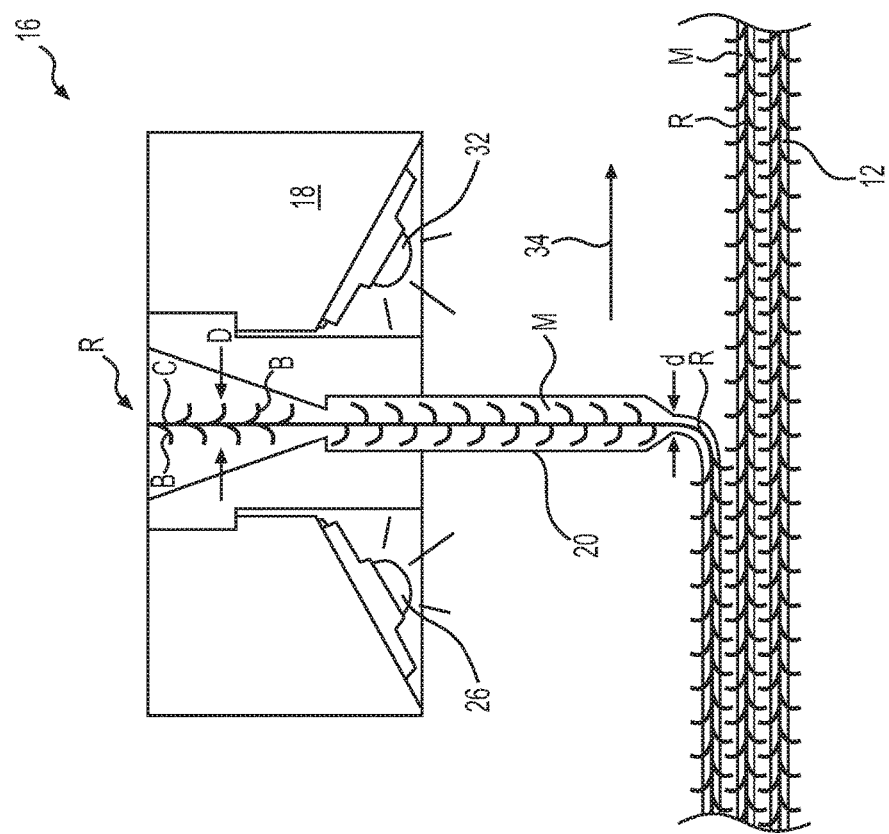

In the disclosed embodiment, the unique matrix is a "click" or reversible resin (e.g., a Triazolinedione, a covalent-adaptable network, a spatioselective reversible resin, etc.). A reversible resin is a photopolymer having controllable molecularization. Specifically, when a reversible resin is exposed to a first wavelength of light (e.g., about 250 nm), the resin is cured during a phase change from a first state (e.g., a liquid state) to a second state (e.g., a solid state). And when the same resin is subsequently exposed to a second wavelength of light (e.g., about 300 nm), the resin reverses phase (e.g., only partially or completely) back to the first state. In the embodiment of FIG. 3, the first wavelength of light is provided by cure enhancer 26 during normal discharge of a current track of composite material utilizing a reversible resin as the matrix M surrounding the continuous reinforcement R. In this same embodiment, the second wavelength of light is provided by way of deactivator 32.

As shown in FIG. 3, cure enhancer 26 and deactivator 32 may be strategically located relative to a travel direction of head 16 (represented by an arrow 34). For example, cure enhancer 26 may be located to expose the green (e.g., uncured) composite material discharging from nozzle 20 at a currently layer (e.g., just behind the tip of nozzle 20), while deactivator 32 may be located to expose the already cured composite material previously discharged by nozzle 20 at an adjacent layer (e.g., just in front of the tip of nozzle 20). In other words, deactivator 32 may be located at a side of nozzle 20 that is opposite cure enhancer 26. The exposure of the already cured composite material to the second wavelength of light at a location just in front of the tip of nozzle 20 may partially or completely reverse the curing (e.g., soften or liquify the reversible resin) originally imparted by the first wavelength of light, such that the exposed tips of the branches B of the currently discharging composite material may penetrate the previously discharged material.

In an alternative embodiment shown in FIG. 7, the branches B are not exposed (i.e., do not extend through the matrix coating on the core C) immediately after discharge from nozzle 20. In particular, in this embodiment, the branches B are not compressed during passage from nozzle 20, such that the diameter D discussed above is about equal to or less than the diameter d. This arrangement can be used to simply increase the strength of a single track of discharged composite material (e.g., by having reinforcements R in both axial and radial directions). Alternatively, this arrangement can be coupled with the use of a compactor 36 to provide mechanical cross-bonding between adjacent layers similar to that described above. For example, the tips of the branches B may be exposed only after compactor 36 has moved across and compacted the discharging material. Compactor 36 may not only flatten out the matrix coating on the core C (e.g., reduce the diameter d to be less than the diameter D), but also press the discharging track of composite material onto the exposed branches B of the previously discharged layer. And in the same way described above, deactivator 32 may be selectively energized (e.g., by controller 28—referring to FIG. 1) to soften or liquify the previously discharged layer at a leading edge of nozzle 20 and compactor 36, such that compactor 36 may force the branches B of the discharging track of material into the previously discharged layer. Compactor 36 may be, for example, a roller (shown), a shoe, or another device known in the art. It is contemplated that the composite material may be exposed to cure enhancing energy before (shown) and/or after compaction, as desired.

In some applications, deactivator 32 may be used to manipulate the previously discharged layer of composite material in additional ways. For example, deactivator 32 may be selectively energized to soften or liquify the previously discharged layer of composite material in preparation for bending, twisting, warping, extraction and/or replacement, etc. by compactor 36 or another auxiliary device (not shown). This may allow for complex shapes of structure 12 that were previously not possible.

Figure 8:
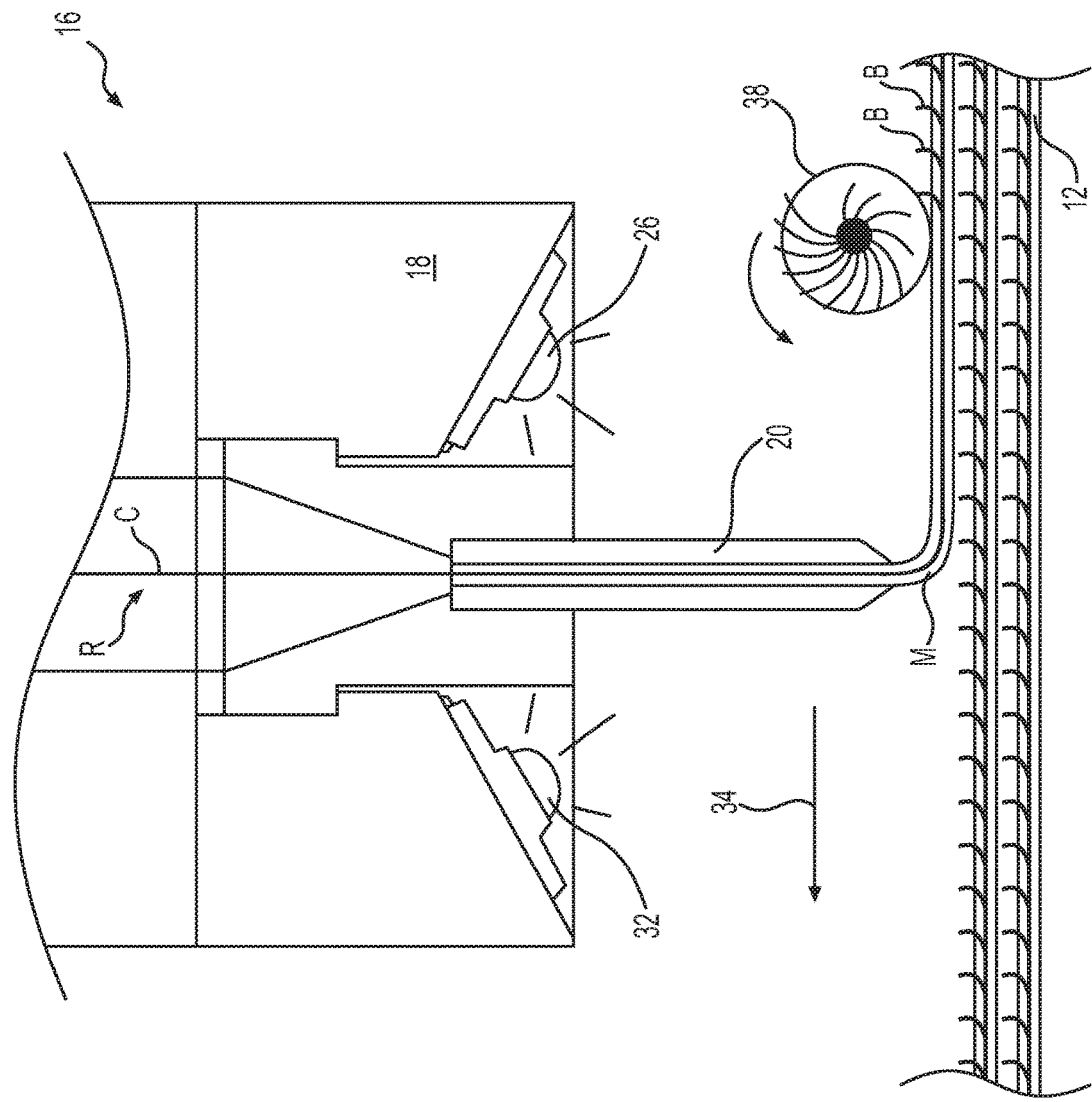

In another alternative embodiment shown in FIG. 8, the branches B (or additional branches B) may be separate from the core C and added to the composite material after discharge from nozzle 20. For example, while the discharging composite material is not yet fully cured, the branches B may be pressed down into the composite material. The branches B may be pressed only part way through the composite material, such that the branches extend from only one side of the composite material. Alternatively, the branches B may be pressed through the composite material and at least partway into a previously discharged and softened or liquified layer of composite material. In the embodiment of FIG. 8, a modified compactor 38 is used to insert the branches B into the composite material. It is contemplated, however, that another device (e.g., a dedicated branch-insertion device—not shown) could alternatively or additionally perform this function, if desired.

INDUSTRIAL APPLICABILITY

The disclosed system may be used to continuously manufacture composite structures having any desired cross-sectional shape, length, density, and/or strength. The composite structures may include any number of different reinforcements of the same or different types, diameters, shapes, configurations, and consists, and/or any number of different matrixes. Operation of system 10 will now be described in detail.

At a start of a manufacturing event, information regarding a desired structure 12 may be loaded into system 10 (e.g., into controller 28 that is responsible for regulating operation of support 14, cure enhancer(s) 26, jet(s) 30, regulating device(s) 36, fiber-teasing mechanism(s) 38, and/or any other associated components). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), location-specific matrix stipulations, location-specific reinforcement stipulations, desired cure rates, cure locations, cure shapes, cure amounts, etc. It should be noted that this information may alternatively or additionally be loaded into system 10 at different times and/or continuously during the manufacturing event, if desired.

Based on the component information, a specific nozzle 20, cure enhancer configuration, and/or deactivator configuration may be connected to head 16 (e.g., to the discharge end of body 18), and one or more different (e.g., different sizes, shapes, and/or types of) reinforcements and/or matrixes may be selectively installed within system 10 and/or continuously supplied into nozzle 20. The corresponding reinforcements (e.g., prepreg or dry fibers, tows, ribbons, or sheets) may be passed through one or more fiber-teasing mechanisms (e.g., between the bristles of adjacent brushes, and/or over or around protrusions, etc.—not shown) and nozzle 20, and thereafter connected to a pulling machine (not shown) and/or to a mounting fixture (e.g., to anchor point 24). Installation of the matrix may include filling chamber 30 with a reversible resin and/or coupling of an extruder (not shown) to head 16.

Head 16 may be moved by support 14 under the regulation of controller 28 to cause matrix-coated reinforcements to be placed against or on a corresponding anchor point 24. Cure enhancers 26 may then be selectively activated (e.g., turned on at the first wavelength by controller 28) to cause hardening of the reversible resin surrounding the reinforcements, thereby bonding the reinforcements to anchor point 24.

The component information may then be used to control operation of system 10. For example, the reinforcements may be pulled through the fiber-teasing mechanism; separated and/or flattened; submerged within the reversible resin, wrung out by any associated regulating device (not shown); and then discharged from nozzle 20. Controller 28 selectively cause support 14 to move head 16 in a desired manner at this time, such that an axis of the resulting structure 12 follows a desired trajectory (e.g., a free-space, unsupported, 3-D trajectory). In addition, cure enhancers 26 may be selectively activated by controller 28 at the first wavelength during material discharge to initiate, speed up, or complete hardening of the reversible resin.

When tracks of composite material are to be discharged adjacent each other and/or in an overlapping manner, controller 28 may selectively activate deactivator 32 to expose the first track of material to the second wavelength of light. As described above, this exposure may soften or liquify the reversible resin in the first track of material, allowing penetration of branches B from the discharging track of material. In addition, compactor 36 and/or 38 may be utilized to push the branches B of adjacent tracks of material into the corresponding reversible resin coatings and thereby mechanically cross-bond the tracks. Once structure 12 has grown to a desired length, structure 12 may be disconnected (e.g., severed) from head 16 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A system for additively manufacturing a composite structure, comprising:
   a support moveable in multiple dimensions;
   a print head connected to an end of the support and having a nozzle;
   a cure enhancer located at a trailing edge of the nozzle; and
   a deactivator located at a leading edge of the nozzle.

2. The system of claim 1, wherein:
   the cure enhancer is configured to generate light having a wavelength of about 250 nm; and
   the deactivator is configured to generate light having a wavelength of about 300 nm.

3. The system of claim 1, further including a branch insertion device located at a trailing side of the nozzle.

4. The system of claim 1, wherein the nozzle is configured to discharge a matrix wetted continuous reinforcement and has an inner diameter less than an outer diameter of the continuous reinforcement after the matrix wetted continuous reinforcement passes through the nozzle.

5. The system of claim 4, wherein the outer diameter of the continuous reinforcement includes a distance between opposing tips of branches that protrude radially outward from a central core, when the branches are in a natural state.

6. The system of claim 4, wherein the print head includes an internal matrix chamber located upstream of the nozzle and configured to wet the continuous reinforcement with a matrix.

7. The system of claim 6, wherein:
   the cure enhancer is configured to initiate curing of the matrix; and
   the deactivator is configured to at least partially reverse curing of the matrix.

8. The system of claim 7, wherein the deactivator is configured to soften the matrix.

9. The system of claim 5, further including a compactor configured to press the matrix wetted continuous reinforcement against a previously discharged track of matrix wetted continuous reinforcement.

10. The system of claim 9, wherein the compactor is configured to press the matrix wetted continuous reinforcement against a previously discharged track of matrix wetted continuous reinforcement only after the deactivator has softened the matrix wetted continuous reinforcement.

11. The system of claim 10, wherein the cure enhancer is configured to expose matrix in the previously discharged track of matrix wetted continuous reinforcement and in a discharging track of matrix wetted continuous reinforcement to a cure energy at the same time.

12. A system for additively manufacturing a composite structure, comprising:
   a support moveable in multiple dimensions;
   a print head connected to an end of the support and having a nozzle configured to discharge a matrix wetted continuous reinforcement, wherein an inner diameter of the nozzle is less than an outer diameter of the matrix wetted continuous reinforcement after the matrix wetted continuous reinforcement is discharged from the nozzle; and
   a cure enhancer located at a trailing edge of the nozzle.

13. The system of claim 12, wherein the outer diameter of the matrix wetted continuous reinforcement includes a distance between opposing tips of branches that protrude radially outward from a central core, when the branches are in a natural state.

14. The system of claim 12, wherein the print head includes an internal matrix chamber located upstream of the nozzle and configured to wet continuous reinforcements with matrix.

15. The system of claim 14, further including a deactivator configured to at least partially reverse curing of the matrix initiated by the cure enhancer.

16. The system of claim 15, wherein the deactivator is configured to soften the matrix.

17. The system of claim 15, further including a compactor configured to press the matrix wetted continuous reinforcement against a previously discharged track of matrix wetted continuous reinforcement.

18. The system of claim 17, wherein the compactor is configured to press the matrix wetted continuous reinforcement against a previously discharged track of matrix wetted continuous reinforcement only after the deactivator has softened the matrix.

19. The system of claim 18, wherein the cure enhancer is configured to expose the matrix in the previously discharged track of matrix wetted continuous reinforcement and in a discharging track of matrix wetted continuous reinforcement to a cure energy at the same time.

20. A system for additively manufacturing a composite structure, comprising:
   a support moveable in multiple dimensions;
   a print head connected to an end of the support and having:
      a nozzle configured to discharge a matrix wetted continuous reinforcement, wherein an inner diameter of the nozzle is less than an outer diameter of the matrix wetted continuous reinforcement after the matrix wetted continuous reinforcement is discharged from the nozzle;
      an internal matrix chamber located upstream of the nozzle and configured to wet continuous reinforcement with matrix;
      a cure enhancer located at a trailing edge of the nozzle;
      a deactivator located at a leading edge of the nozzle and configured to at least partially reverse curing of the matrix initiated by the cure enhancer and soften the matrix; and
      a compactor located between the nozzle and the cure enhancer and configured to press the matrix wetted continuous reinforcement against a previously discharged track of matrix wetted continuous reinforcement only after the deactivator has softened the matrix,
   wherein the cure enhancer is configured to expose the matrix in the previously discharged track of matrix wetted continuous reinforcement and in a discharging track of matrix wetted continuous reinforcement to a cure energy at the same time.

* * * * *